(12) United States Patent
Arcand et al.

(10) Patent No.: US 11,437,896 B2
(45) Date of Patent: Sep. 6, 2022

(54) SLIP RING ASSEMBLY

(71) Applicant: Saint-Augustin Canada Electric Inc., Saint-Augustin-De-Desmaures (CA)

(72) Inventors: Sebastien Arcand, Saint-Augustin-De-Desmaures (CA); Michaël Gagnon, Quebec (CA); Sophie Garneau, Saint-Augustin-De-Desmaures (CA)

(73) Assignee: Saint-Augustin Canada Electric Inc., Saint-Augustin-de-Desmaures (CA)

( * ) Notice: Subject to any disclaimer, the term of this patent is extended or adjusted under 35 U.S.C. 154(b) by 230 days.

(21) Appl. No.: 16/764,734

(22) PCT Filed: Dec. 13, 2019

(86) PCT No.: PCT/IB2019/060796
§ 371 (c)(1),
(2) Date: May 15, 2020

(87) PCT Pub. No.: WO2020/121280
PCT Pub. Date: Jun. 18, 2020

(65) Prior Publication Data
US 2021/0218319 A1   Jul. 15, 2021

Related U.S. Application Data

(60) Provisional application No. 62/779,745, filed on Dec. 14, 2018.

(51) Int. Cl.
*H02K 13/00* (2006.01)
*F03D 80/80* (2016.01)
(Continued)

(52) U.S. Cl.
CPC .......... *H02K 13/003* (2013.01); *F03D 80/80* (2016.05); *H01R 39/025* (2013.01); *H01R 39/10* (2013.01);
(Continued)

(58) Field of Classification Search
CPC .... H02K 13/003; H02K 7/1838; F03D 80/80; F03D 80/85; H01R 39/025; H01R 39/10;
(Continued)

(56) References Cited

U.S. PATENT DOCUMENTS

2004/0130230 A1* 7/2004 Zilch ............... H01R 39/14
310/113
2011/0254283 A1* 10/2011 Ollgaard ............... F03D 80/85
290/55
(Continued)

FOREIGN PATENT DOCUMENTS

CN   104362488 A   2/2015
CN   105337132 A   2/2016
(Continued)

OTHER PUBLICATIONS

International Search Report; Canadian Intellectual Property Office; International Application No. PCT/IB2019/060796 dated Apr. 14, 2020; 3 pages.
(Continued)

*Primary Examiner* — Charles Reid, Jr.
(74) *Attorney, Agent, or Firm* — Taft Stettinius & Hollister LLP

(57) ABSTRACT

A slip ring assembly including a plurality conducting disks spaced-apart and stacked mounted along a common rotation axis, each being electrically connectable and fixedly securable to a generator mounted in a rotatable nacelle of a wind turbine so that a rotation of the rotatable nacelle triggers a rotation of the conducting discs; and a plurality of slip ring
(Continued)

devices, each being electrically connectable and mechanically securable to a fixed electrical distribution conductor mounted to a fixed pole so as to have a fixed position relative to the fixed pole, and each of the plurality of the slip ring devices having upper and conducting fingers arranged so as to rotatably receive a respective conducting disk therebetween and to provide an electrical connection between the conducting disks and the slip ring device during rotation of the nacelle.

18 Claims, 4 Drawing Sheets

(51) Int. Cl.
    *H01R 39/02*      (2006.01)
    *H01R 39/10*      (2006.01)
    *H01R 39/14*      (2006.01)
    *H01R 39/20*      (2006.01)
    *H01R 39/26*      (2006.01)
    *H02K 7/18*      (2006.01)

(52) U.S. Cl.
    CPC ............. *H01R 39/14* (2013.01); *H01R 39/20* (2013.01); *H01R 39/26* (2013.01); *H02K 7/1838* (2013.01); *F05B 2220/706* (2013.01)

(58) Field of Classification Search
    CPC ........ H01R 39/14; H01R 39/20; H01R 39/26; F05B 2220/706
    USPC .......................................... 290/1 R, 3, 44, 55
    See application file for complete search history.

(56) References Cited

U.S. PATENT DOCUMENTS

2014/0255151 A1*    9/2014    Jensen ...................... F03D 1/04
                                                        415/121.3
2015/0180186 A1*    6/2015    Vander Lind ......... B64C 39/022
                                                           290/55

FOREIGN PATENT DOCUMENTS

EP            0030896 A1      6/1981
GB           2167612 A   *   5/1986   ............. F03D 15/00

OTHER PUBLICATIONS

Written Opinion of the International Searching Authority; Canadian Intellectual Property Office; International Application No. PCT/IB2019/060796; dated Apr. 14, 2020; 4 pages.

* cited by examiner

SLIP RING ASSEMBLY

CROSS REFERENCE TO RELATED APPLICATIONS

This application is a U.S. National Phase of International PCT Application No. PCT/IB2019/060796 filed Dec. 13, 2019, which claims the benefit of U.S. Provisional Patent Application Ser. No. 62/779,745 filed Dec. 14, 2018, the contents of each application hereby incorporated by reference in their entirety.

TECHNICAL FIELD

The present invention generally relates to electrical arrangements in wind turbines, and more particularly relates to a slip ring assembly suitable for use in orientable wind turbines.

BACKGROUND

Typical wind turbines are generally made of a pole having several tubular sections mounted together with a nacelle positioned at the top of the pole. Electrical cables and/or rigid aluminum/copper conductors attached to the tubular sections are typically used to convey the electric power produced by the generator from the nacelle to the bottom of the wind turbine.

Horizontal axis wind turbines are usually provided with a yaw drive mounted in the nacelle and devised to orient the rotor with the blades to face the wind whichever is the direction of the wind. When the direction of the wind changes, the yaw drive is operated to rotate the nacelle in an adequate direction so as to face the wind while the tubular sections remain fixed relative to the ground.

The power produced by the generator in the nacelle must be transferred down the pole, for example for connection to the power system. Since the generator must yaw to keep pointed into the wind, the main power cables or conductors have to be adapted to handle this rotating movement.

Presently, in some configurations, a flexible cable is attached in a loose loop from the wind generator power terminals to where the distribution conductors come up the pole. The cable is generally long enough for allowing several wraps of the flexible cable loop, thereby allowing the required movements of the nacelle during a convenient time without maintenance. However, maintenance is still required to unwind the cable when required.

A lap counter associated to the electronic control system of the wind turbine may be used to monitor winding and unwinding of the cable loop. If there is too much winding in one direction, the control system may then rotate the wind turbine in the opposite direction in order to unwind the cable loop. Such solution complexifies the control of the wind turbine and increases the costs. Moreover, during the unwinding operation, the wind turbine may not be able to be used optimally for power generation.

It would therefore be desirable to provide an improved electrical arrangement for a wind turbine that would reduce at least one of the above-mentioned drawbacks of the prior art.

SUMMARY

According to a broad aspect, there is provided a slip ring assembly for electrically connecting a generator mounted in a rotatable nacelle of an orientable wind turbine and fixed electrical distribution conductors mounted to a fixed pole of the orientable wind turbine, the slip ring assembly comprising: a plurality of conducting disks being spaced-apart and stacked mounted along a common rotation axis, each being electrically connectable to a respective electrical output of the generator and being fixedly securable to the generator so that a rotation of the rotatable nacelle triggers a rotation of the conducting disks; and a plurality of slip ring devices each being electrically connectable and mechanically securable to a respective one of the fixed electrical distribution conductors so as to have a fixed position relative to the fixed pole, each one of the plurality of the slip ring devices comprising at least one upper conducting finger and at least one lower conducting finger arranged so as to rotatably receive a respective one of the plurality of conducting disks therebetween and provide an electrical connection between the respective one of the plurality of conducting disks and the slip ring device, a rotation of the nacelle triggering a rotation of the conducting disks relative to the at least one upper conducting finger and the at least one lower conducting finger so that an electrical current flow between the generator and the fixed electrical distribution conductors during the rotation of the nacelle.

In one embodiment, the slip ring assembly further comprises a housing to be positioned so as to have a fixed position relative to the fixed pole, the conducting disks being positioned within the housing and being rotatable relative to the housing.

In one embodiment, the housing comprises a first wall provided with a connection aperture, a second wall opposite to the first wall and a lateral wall extending between the first and second walls, the second wall being securable to the fixed pole.

In one embodiment, each one of the plurality of slip rings comprises a conducting plate extending longitudinally between a first plate end and a second plate end and having the at least one upper conducting finger projecting from the first plate end and secured on a first face thereof and the at least one upper conducting finger projecting from the first plate end and secured on a second face thereof, the second face being opposite to the first face, and the second plate end being electrically connectable to a given one of the fixed electrical distribution conductors.

In one embodiment, the lateral wall is provided with a plurality of connection holes each for receiving the conducting plate of a respective one of the slip rings therein.

In one embodiment, the conducting disks are rotatably secured to the second wall of the housing.

In one embodiment, the slip ring assembly further comprises a plurality of elongated conductors each extending longitudinally between a first connection end electrically connectable to the generator and a second connection end electrically connected to a respective one of the conducting disks.

In one embodiment, each one of the elongated conductors extends within a tunnel formed by an inner aperture of the conducting disks up to the respective one of the conducting disks and through the connection aperture of the first wall of the housing.

In one embodiment, a diameter of the inner aperture is identical for all of the conducting disks.

In one embodiment, an inner edge of each one of the conducting disks is provided with a inwardly projecting mounting section, the second connection end elongated conductor being secured to the inwardly projecting mounting section.

In one embodiment, a diameter of the inner aperture varies from one of the conducting disks to another one of the conducting disks.

In one embodiment, the slip ring assembly further comprises a cover rotatably mounted to the housing and comprising a plurality of conductor holes each for receiving a respective one of the elongated conductors.

In one embodiment, the slip ring assembly further comprises a plurality of resilient devices each being mounted with a corresponding slip ring for urging the at least one upper conducting finger and the at least one lower conducting finger against the respective one of the conducting disks to maintain the electrical connection therebetween.

In one embodiment, the at least one upper conducting finger comprises a plurality of upper fingers mounted side-by-side and the at least one lower conducting finger comprises a plurality of lower fingers mounted side-by-side and each being associated with a respective one of the upper fingers to form a plurality of pairs of fingers.

In one embodiment, each one of the resilient devices comprises a plurality of springs each being associated with a respective one of the pairs of fingers.

In one embodiment, each one of the upper fingers and each one of the lower fingers are each provided with a rounded end for abutting the conducting plate.

In one embodiment, each one of the upper and lower conducting fingers is silver plated.

In one embodiment, each one of the conducting disks is provided with an outer upper silver plated surface and an outer lower silver plated surface.

BRIEF DESCRIPTION OF THE DRAWINGS

In order that the invention may be readily understood, embodiments of the invention are illustrated by way of example in the accompanying drawings.

Further details of the invention and its advantages will be apparent from the detailed description included below.

DETAILED DESCRIPTION

In the following description of the embodiments, references to the accompanying drawings are by way of illustration of examples by which the invention may be practiced. It will be understood that other embodiments may be made without departing from the scope of the invention disclosed.

In one embodiment, the present electrical connection arrangement is particularly devised to provide an efficient and/or safe electrical connection between electrical conductors provided on a fixed element/object and other electrical conductors provided on a rotating element/object, such as in a wind turbine provided with a yaw drive. Indeed, in such wind turbines, the nacelle embedding the generator swivels and rotates according to the wind while the conductors used for conveying the generated power to the bottom of the wind turbine are typically fixedly secured along a conductor path along the pole of the wind turbine.

Figure 1:
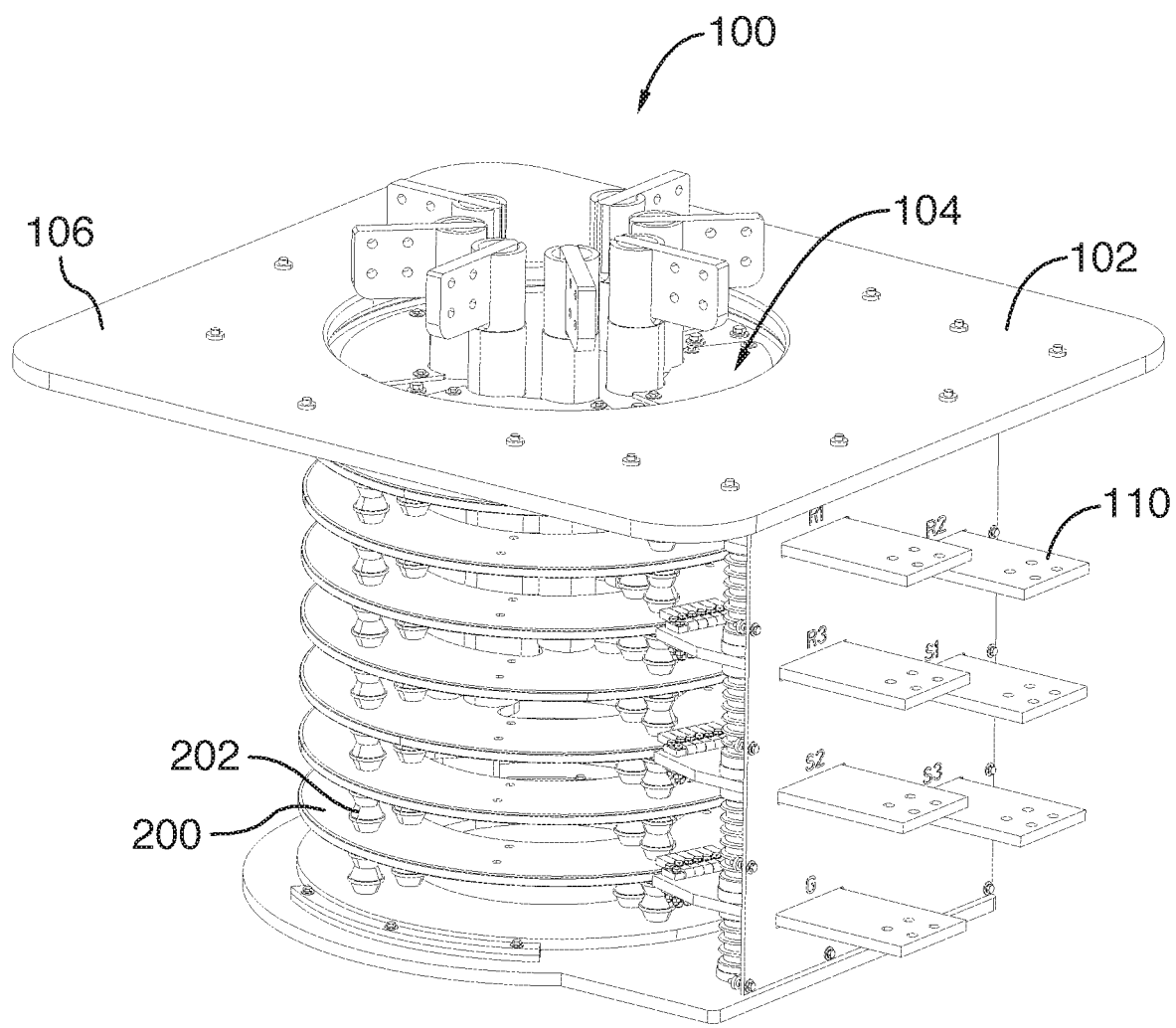
FIG. 1 is a perspective elevated view of a slip ring assembly, according to one embodiment.
Figure 2:
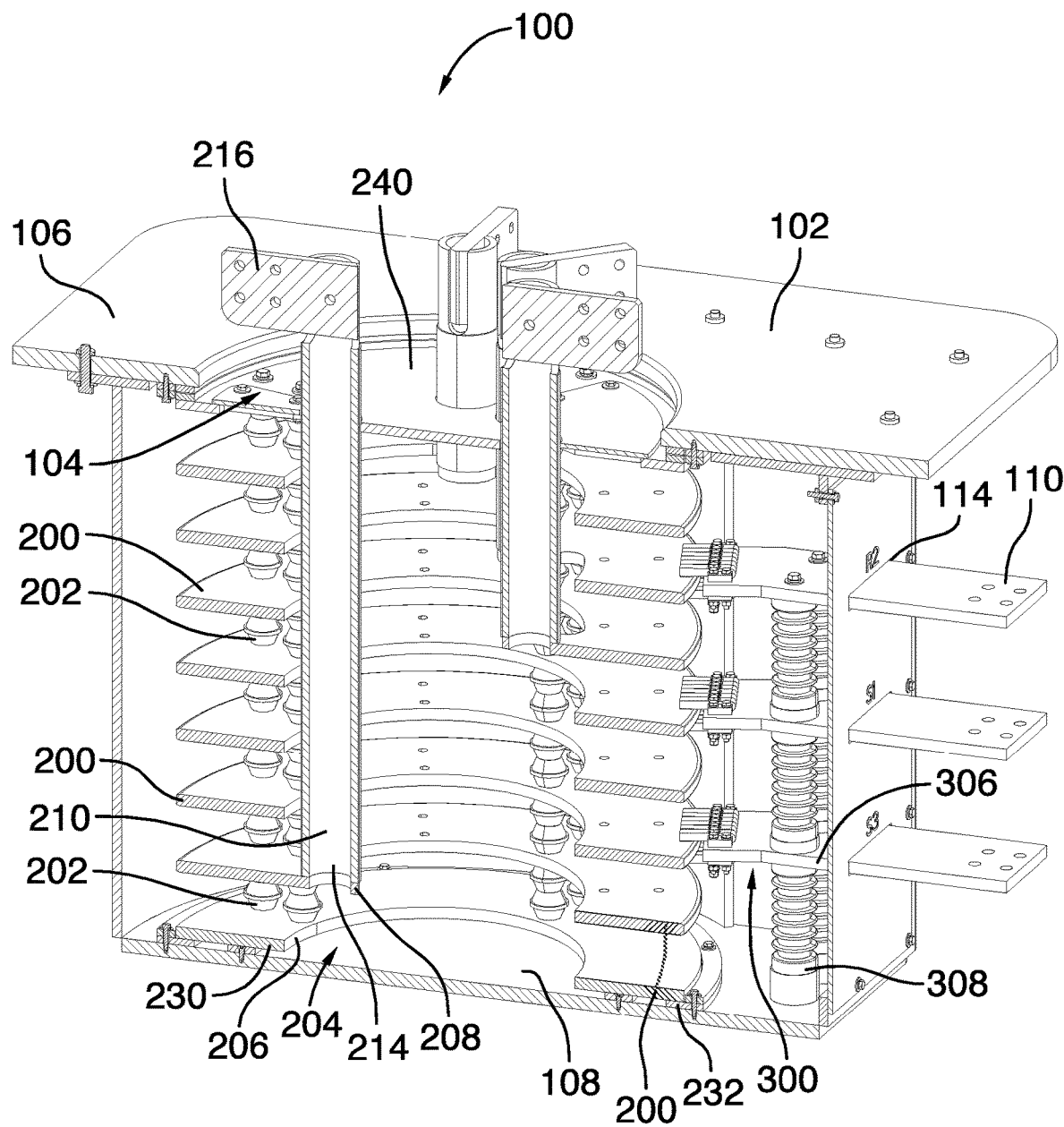
FIG. 2 is a perspective elevated view in cross section of the slip ring assembly of FIG. 1.

Referring to FIGS. 1 and 2, there is shown a slip ring assembly 100 for providing electrical connection between electrical output conductors of a generator of an orientable wind turbine (not shown) for example and fixed electrical distribution conductors (not shown), according to one embodiment.

In this embodiment, the slip ring assembly 100 is mounted inside a housing 102 that may be fixedly attached to the pole of the wind turbine (not shown). The housing 102 is made of electrically insulating material and comprises an upper wall 106 provided with an opening 104 for electrical connection purposes, a bottom wall 108 and a lateral wall having four panels/faces and extending between the upper and bottom walls 106 and 108. but various other arrangements may be considered, as it will become apparent below. In the illustrated embodiment, the housing 102 comprises a bottom wall, Depending on a given application, the slip ring assembly 100 may be adapted for use with any number of input electrical conductors and/or any number of output electrical conductors. For example, in the illustrated embodiment, the slip ring assembly 100 is devised to electrically connect seven input conductors each to a respective one of seven output conductors. The seven input conductors may comprise three input conductors for the rotor of a generator (1 per phase), three input conductors for the stator of the generator (1 per phase) and one input conductor for the ground. It should be understood that in this case, the seven output conductors also comprise three output conductors for the rotor, three output conductors for the stator and one output conductor for the ground. Other arrangements using one or two phases only with or without a neutral and/or a ground may also be considered for another exemplary application.

As better illustrated in FIG. 2, the slip ring assembly 100 comprises seven spaced-apart rotating conducting disks 200 stacked mounted, i.e. the disks 200 share a same rotation axis and are positioned at different locations along the rotation axis. Each disk 200 is rotatably secured to the housing 102. In one embodiment, the disks 200 have a fixed relative position so that a rotation of one of the disks 200 triggers the rotation of the other disks 200. Each disk 200 is made of an electrically conducting material. In one embodiment, adjacent disks 200 are electrically insulated from one another. In this case, it should be understood that any adequate devices for electrically adjacent disks 200 may be used.

The skilled addressee will appreciate that, in another embodiment, it could be considered to provide an arrangement wherein the conducting disks 200 could rotate independently the ones from the others, if required in a given application. Similarly, adjacent disks 200 may not be electrically insulated from one another.

As illustrated in FIG. 2, several disk electrical isolators 202 made from an electrically insulating material and distributed at various locations around the surface area of the conducting disks 200 are positioned between two adjacent conducting disks 200 to secure them together and electrically isolate them from each other. In the illustrated embodiment, eight disk isolators 202 are used for electrically isolating two adjacent conducting disks 200. The eight disk isolators 202 are grouped as four sets of two disk isolators 202 and the two disk isolators 202 of a same set have the same angular position around the circumference of the conducting disks 200. In the illustrated embodiment, the four sets of disk isolators 202 have a different respective angular position around the circumference of the conducting disks 200 and are evenly angularly spaced, i.e. the sets of disk isolators are positioned at 0, 90, 180 and 270 degrees around the circumference of the conducting disks 200. Furthermore, the four sets of disk isolators 202 connecting two given adjacent conducting disks 200 are each aligned with a respective one of four sets of disk isolators 202 connecting two other conducting disks 200.

It should be understood that the number and/or position of the disk isolators 202 may vary.

It should be understood that any adequate method and/or device for securing a disk isolator 202 to a conducting disk 200 may be used. For example, a threaded rod or pin (not shown) may be mounted through a hole provided in the conducting disk 200 to secure a disk isolator 202 extending above and/or below the conducting disk 200 to the conducting disk 200.

In one embodiment, the lowest disk 200 is fixedly secured to a mounting disk 230 which is rotatably secured to a bottom wall of the housing 102 so as to be rotatable about the rotation axis of the conducting disks 200. Since the conducting disks 200 are all secured together thanks to the disk isolators 202 and the lowest conducting disk 200 is secured to the rotating mounting disk 230, the rotation of any of the conducting disk 200 triggers the rotation of the assembly composed of all of the conducting disks 200 and the mounting disk 230. It should be understood that any adequate means for securing the lowest conducting disk 200 to the mounting disk 230 may be used and that any adequate means for rotatably securing the mounting disk 230 to the housing 202 may also be used.

In the illustrated embodiment, the lowest disk 200 is secured to the mounting disk 230 using disk isolators 202. In this case, the mounting disk 230 may be made of electrically conducting material. However, it should be understood that the mounting disk may be alternatively made from electrically isolating material. In the illustrated embodiment, the mounting disk 230 is rotatably secured to the bottom of the housing 102 with brackets 232 restraining lateral movements of the mounting disk 230. In one embodiment, the mounting disk 230 is adapted for sliding on corresponding sliding surfaces provided on the brackets 232 although other arrangements may be used. In one embodiment, the mounting disk 230 and the brackets 232 are made of insulating material.

In one embodiment, the disk isolators 202 is made of any adequate electrically conducting material such as epoxy, fiberglass or ethylene propylene diene monomer (EPDM) high creepage resistant material. In a further embodiment, the disk isolators 202 could also be used as a system damping device when used in applications where vibrations are important. In such embodiment, rubber material such as EPDM high creepage resistant material may be preferred.

Figure 5:
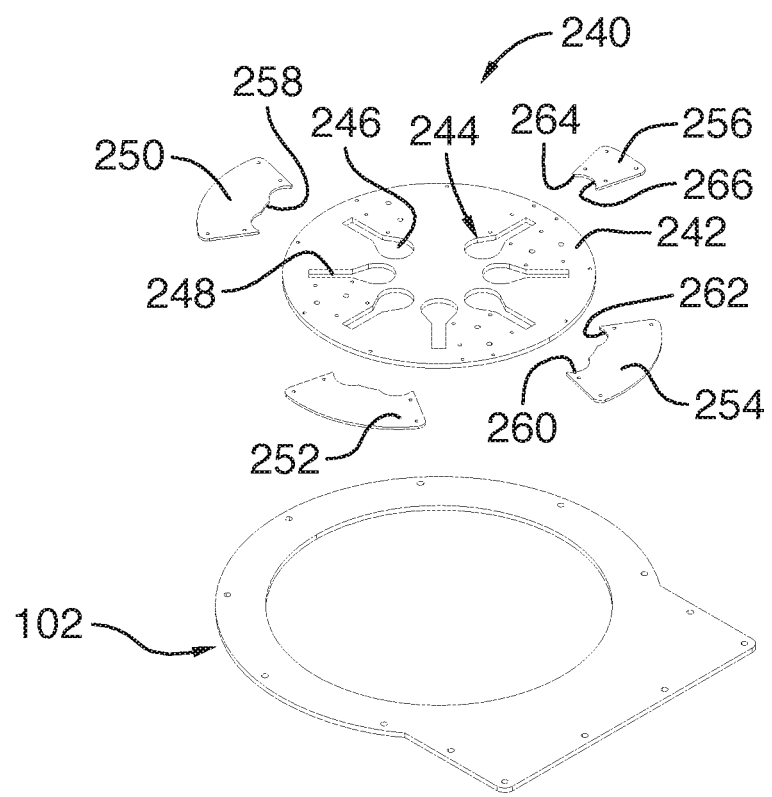
FIG. 5 is an exploded perspective view of the upper cover of the housing of the slip ring assembly of FIG. 1.

Referring again to FIG. 2 and also to FIG. 5, in one embodiment, the housing 102 is provided with an upper cover 240 mounted into the aperture 104 for completely enclosing the stacked disks 200. The upper cover 240 is made of insulating material and is rotatably mounted to the housing 102. In the illustrated embodiment, the upper cover 240 is attached to the adjacent uppermost disk 200 through disks isolators 202, as detailed above. In a further embodiment, the aperture 104 is provided with a radial support flange for rotatably supporting the upper cover 240 thereon but other arrangements may be considered.

FIG. 5 shows an upper cover 240 according to one embodiment. The upper cover 240 has a disk-shaped plate 242 provided with seven apertures 244 distributed therearound for receiving a respective electrical conductor therethrough, as it will become apparent below. Each aperture 244 has a circular hole 246 and a rectangular aperture 248 connected thereto, for easing the mounting and dismounting of the assembly 100, as it will become apparent below. The upper cover 240 is also provided with four circular arc shaped plates 250, 252, 254, 256 mounted with bolt and nut arrangements (not shown) to the disk-shaped plate 242 and distributed therearound for covering the rectangular apertures 248 once the conductors have been mounted therein, as detailed below. In the illustrated embodiment, three of the circular arc shaped plates 250, 252, 254 have an inner edge 258 provided with two spaced apart arc shaped recesses 260, 262, each recess 260, 262 mating with a respective conductor. The fourth circular arc shaped plate 256 has an inner edge 264 provided with a single arc shaped recess 266 for mating with a respective conductor. Such embodiment may protect the interior of the housing 102 from the surrounding.

Referring again to FIG. 2, each disk 200 is mechanically and electrically connectable to the generator using an electrical connection assembly for each disk 200. In one embodiment, the electrical connection assembly comprises an elongated electrical conductors 210 for each conducting disk 200. Each elongated electrical conductor 210 extends longitudinally between a first end electrically connectable to a respective conducting disk 200 and a second end electrically connectable to the generator. In the illustrated assembly, the electrical connection assembly further comprises connection plates 216 each secured at the second end of a respective elongated electrical conductor 210, and each connection plate 216 is secured to a respective output of the generator. While in the illustrated embodiment, the connection plate 216 is rectangular and welded to an elongated electrical conductor 210, it should be understood that the shape and size of the connection plate 216 may vary and any adequate method for securing the connection plate 216 to the elongated electrical conductor 210 may be used. Similarly, while the elongated electrical conductors 210 have a tubular shape in the illustrated embodiment, it should be understood that the shape of the elongated electrical conductors 210 may vary and could be rectangular for example.

Similarly, while the second end of each elongated electrical conductor 210 is provided with a slot in which a respective connection plate 216 is inserted, it should be understood that any other adequate means for securing a connection plate 216 to an elongated electrical conductor 210 may be used.

In one embodiment, the connection plates 216 are omitted and the electrical outputs of the generator are each directly electrically connected to a respective elongated electrical conductor 210.

In the illustrated embodiment, the conducting disks 200 are identical, i.e. they have the same inner diameter, the same outer diameter and the same thickness. Each conducting disk 200 is provided with a concentric aperture 204 defining an inner edge 206 and a protrusion or mounting element 208 that projects inwardly from the edge 206. The conducting disks 200 are stacked one on top of the other so that their apertures 204 be aligned to form a tunnel or cavity in which the elongated electrical connectors 210 are inserted. Furthermore, the relative position of the conducting disks 200 is chosen so that the protrusions 208 are each at a different angular position and not vertically aligned. In one embodiment, the relative position of the conducting disks 200 is chosen so that the protrusions 208 are evenly angularly distributed about the circumference of stacked conducting disks 200.

Each elongated electrical conductor 210 is positioned partially within the cavity formed by the concentric apertures 204 of the stacked conducting disks 200 so that its first end 214 be secured to the protrusion 208 of a respective conducting disk 200 and its second end be located outside of the housing 102. In the illustrated embodiment, the length of the elongated electrical conductors 210 varies from one elongated electrical conductor 210 to another as a function of the position of the given conducting disk 200 to which the elongated electrical conductor is secured within the stack of conducting disks 200, i.e., as a function of the longitudinal distance between the given conducting disk 200 and the top plate of the housing 102. As a result, the second ends of the elongated electrical conductors 210 located outside of the housing 102 are coplanar.

While in the illustrated embodiment, the elongated electrical conductors 210 are provided with different lengths so that their second ends be coplanar, it should be understood that other configuration may be possible. For example, the elongated electrical conductors 210 are all have the same length.

As a result of the above described arrangement between the elongated electrical conductors 210 and the conducting disks 200, each elongated electrical conductor 210 is electrically connected to a respective conducting disk 200 while being electrically isolated from the other conducting disks 200. In an embodiment in which the connection plates 216 are secured to a generator that is secured to a nacelle of a wind turbine, a rotation of the nacelle triggers a rotation of the generator which in turn triggers a rotation of the elongated electrical conductors 210. The rotation of the elongated electrical conductors 210 triggers the rotation of the conducting disks 200 while the housing 102 remains immobile since it is secured to the pole of the wind turbine. As a result, the housing 102 follows the motion of the pole of the wind turbine, i.e., it remains immobile, while the conducting disks 200 follows the motion of the nacelle of the wind turbine, i.e. it rotates according to the rotation of the nacelle.

It should be understood that the angular spacing between adjacent protrusions 208 is chosen so that an elongated electrical conductor 210 that is secured to a given protrusion 208 of a given conducting disk 200 is not in physical contact with any other protrusion 208 so as to be electrically connected to the given conducting disk 200 only and electrically isolated from the other conducting disks 200.

In one embodiment, the conducting disks 200 are made of silver plated high conductive aluminium alloy. In an exemplary embodiment, the conductive disks 200 would be typically 1 meter in diameter for a 2500A application.

Figure 3:
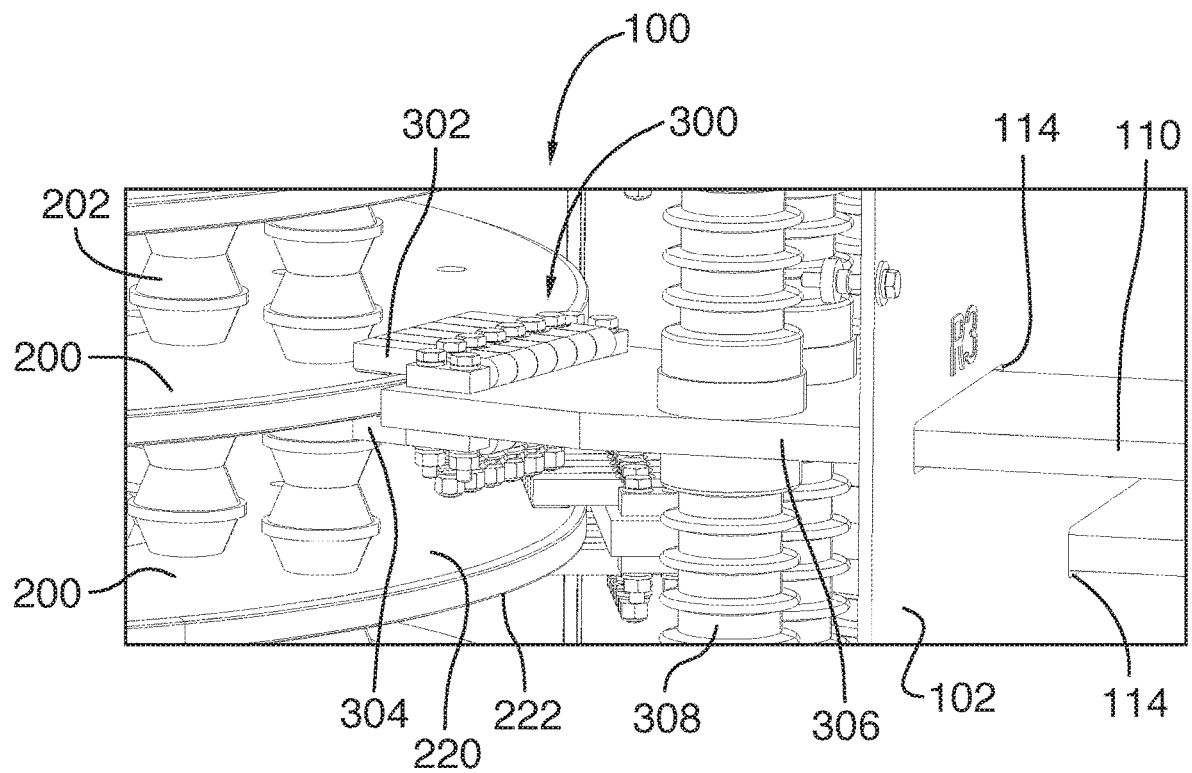
FIG. 3 is another perspective elevated view in cross section of a portion of the slip ring assembly of FIG. 1.

Referring back to FIG. 2 and also to FIG. 3, the slip ring assembly 100 further comprises seven slip ring devices 300, each being electrically connectable to a corresponding one of the fixed electrical distribution conductors (not shown) used to convey power from the assembly 100 to the bottom of the wind turbine. Each slip ring device comprises 300 has a finger conducting plate 306 and a plurality of upper conducting fingers 302 and a plurality of lower conducting fingers 304. Each finger conducting plate 306 extends longitudinally between a first end and a second end, and upper and lower conducting fingers 302 and 304 are mounted to the second end of the finger conducting plate 306 on opposite faces of the finger conducting plate 306 and each project longitudinally and outwardly from the finger conducting plate 306.

The lateral wall of the housing 102 is provided with seven apertures 114 each sized and shaped for receiving a respective finger conducting plate 306 therein, and each substantially facing a respective conducting disk 200. In the illustrated embodiment, three apertures 114 are located on a first face of the lateral wall of the housing 102 while four other apertures 114 are located on another face of the lateral wall of the housing 102. However, it should be understood that other configurations are possible. For example, the seven apertures 114 may be located on the same face of the lateral wall of the housing 102.

Each finger conducting plate 306 is inserted into a respective aperture 114 of the housing so that its first end extends outside of the housing 102 and its second end is located inside the housing 102 adjacent to a respective conducting disk 200. In one embodiment, the dimensions of the apertures 114 substantially correspond to the cross-sectional dimensions of the finger conducting plates 306 so that each finger conducting plate 306 is snuggingly received in its corresponding aperture 114 and the housing 102 provides support for the finger conducting plates 306. In another embodiment, the dimensions of the apertures 114 are greater than the cross-sectional dimensions of the finger conducting plates 306.

Each finger conducting plate 306 is positioned relative to its corresponding conducting disk 200 so that the corresponding conducting disk 200 is sandwiched between the upper fingers 302 secured to the top face of the finger conducting plate 306 and the lower finger 304 secured to the top face of the finger conducting plate 306. The upper fingers 302 and the lower fingers 304 form together a clip that is movably securable to a conducting disk 200. Since they are all made of electrically conducting material, the conducting disk 200, the fingers 302 and 304 and the finger conducting plate 306 are all electrically connected. It should be understood that once the conducting disk 200 is inserted between the fingers 302 and 304, the conducting disk 200 may rotate about its rotation axis while still being in physical contact with the fingers 302 and 304 so that an electrical current may flow between the conducting disk 200 and the finger conducting plate 306 via the fingers 302 and 304 during the rotation of the conducting disk 200.

In one embodiment such as the illustrated embodiment, plate isolators 308 made of electrically insulating material fixedly secure the finger conducting plates 306 to the housing 102. A first plate isolator 308 extends a first end secured to the bottom wall of the housing 102 and a second end secured to the lowest finger conducting plate 306 to fixedly secure the lowest finger conducting plate 306 to the housing 102 and optionally electrically isolate the lowest finger conducting plate 306 from the housing 102. A plate isolator 308 is further inserted between two adjacent finger conducting plates 306 to fixedly secure the finger conducting plates 306 together and to the housing 102 via the lowest finger conducting plate 306.

In an embodiment in which the finger conducting plates 306 are arranged in two or more columns, the lowest finger conducting plate 306 of each column is secured to the bottom wall of the housing 102 via at least one plate isolator 308. In one embodiment, the fingers plate isolators 308 which secure the finger conducting plates 306 to the housing 102 are provided with a resilient element enabling slight independent bending motion of the fingers plates 306 with respect to the housing 102. This may be of great advantage in harsh vibrating environments wherein the conductors connected to the electrical connections 110 may be subjected to vibrations. Of course, other arrangements for mounting the fingers plates 306 could be used. In one embodiment, the fingers plate isolators 308 could be made of epoxy, fiberglass or EPDM high creepage resistant material. In a further embodiment, the fingers plate isolators 308 could also be used as a system damping device when used in applications where vibrations are important. In such embodiment, EPDM high creepage resistant material may be preferred.

While in the illustrated embodiment, each slip ring 300 has six upper conducting fingers 302 mounted side by side on the top face of the finger conducting plate 306 and six lower conducting fingers 304 mounted side by side on the finger conducting plate 306, it should be understood that the number of fingers may vary as long as a slip ring 300 comprises at least one upper finger 302 and/or at least one lower finger 304. In one embodiment, the number of conducting fingers 302 and 304 may be determined according to the required ampacity and short circuit level required in a given application.

Figure 4:
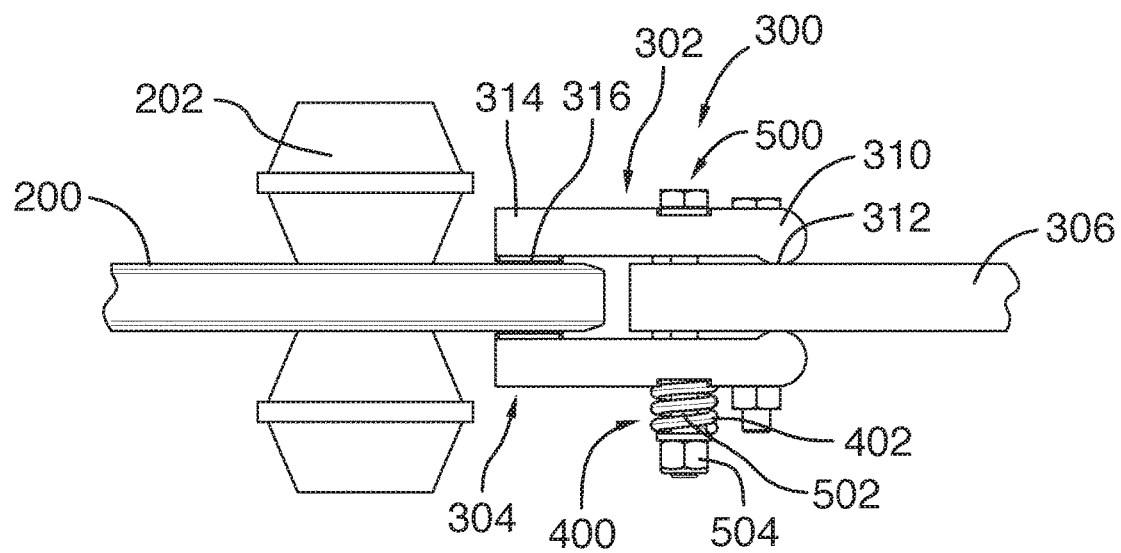
FIG. 4 is a side view of a portion of the slip ring assembly of FIG. 1, showing a conducting disk mounted between upper and lower conducting fingers, according to one embodiment.

Still referring to FIG. 3, and also to FIG. 4, in one embodiment, each of the upper and lower fingers 302 and 304 has a first end 310 with a rounded surface 312 for mounting on the finger conducting plate 306 and an opposite second end 314 for contacting the rotating conducting disk 200. In one embodiment, the second end 314 is provided with a raised surface 316 devised to ease the physical contact with the conducting disk 200 even in an environment prone to vibrations as the one in a wind turbine, as it will become apparent below.

In one embodiment, each of the upper and lower conducting fingers 302 and 304 is made of copper that is silver plated. In a further embodiment, each of the conducting disks 200 is also provided with an outer upper silver plated surface 220 and an outer lower silver plated surface 222 therearound, respectively in contact with the upper and lower conducting fingers 302, 304, as shown in FIG. 3. The silver plating prevents oxidation of the aluminium of the conducting disks 200. The thickness of the silver plating may be determined as a function of the use of the slip ring. In other words, the mean time between maintenance could be lowered by a thicker silver plating, as it should become apparent to the skilled addressee.

Still referring to FIG. 3 and FIG. 4, the slip ring assembly 100 is also provided with a plurality of resilient devices 400, each being mounted with a corresponding slip ring 300 for urging the corresponding conducting fingers 302 and 304 against the conducting disk 200 to maintain electrical connection therebetween and thereby provide an electrical connection between the conducting disk 200 and the electrical connection 110 provided at the opposed end of the finger conducting plate 306. In one embodiment, each of the resilient devices 400 comprises at least one spring 402, each spring 402 being associated with a corresponding pair of upper and lower fingers 302, 304. More particularly, in one embodiment, as illustrated, each pair of facing upper and lower fingers 302 and 304 is provided with a spring 402 used to urge the fingers 302 and 304 against the disk surfaces 220 and 222 and against the finger conducting plate 306. In one embodiment, a pass through bolt and screw assembly 500 is used to attached the fingers 302 and 304 to the fingers plate 306 and the spring 402 in mounted around the screw shaft 502 between the lower finger 304 and the bolt 504. Such an arrangement may allow independent slight movements of each pair of conducting fingers 302, 304 with respect to the corresponding conducting disk 200. The bolt 504 may be used to more or less tighten the fingers 302 and 304 and conducting disk 200 assembly. Such an embodiment may be of great interest in environments prone to vibrations.

As it should now be apparent, when the nacelle of the wind turbine rotates, each of the rotating disks 200 will rotate accordingly, driven by the movements of the rigid conductors 210 connected to the generator while the housing 102 has a fixed position. During the rotation of the nacelle, the conducting disks 200 rotate inside the clips formed by the upper and lower fingers which are fixedly secured to the housing 102, thereby allowing electrical current to flow from the generator to the finger conducting plates 306 which are electrically connected to electrical conductors running along the pole of the wind turbine.

Figure 6:
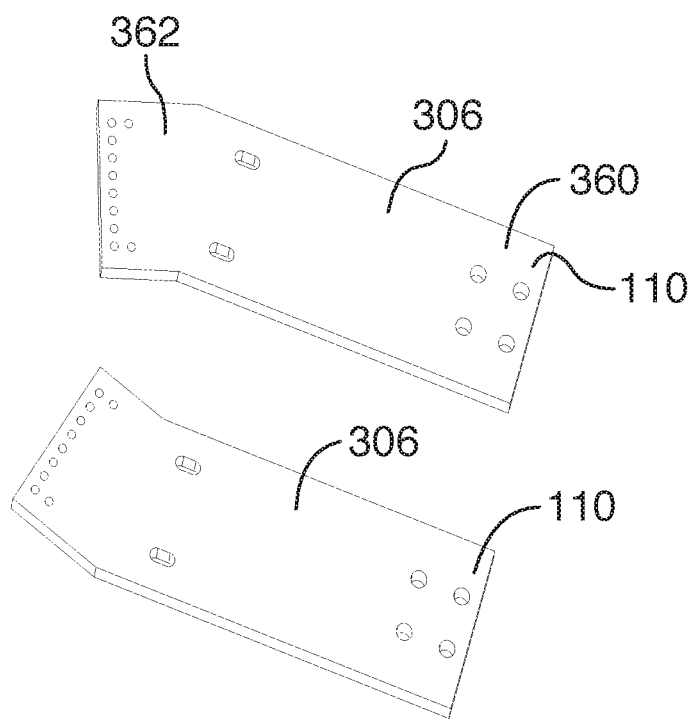
FIG. 6 is a perspective elevated view of first and second finger conducting plates used in the slip ring assembly of FIG. 1, according to one embodiment.

FIG. 6 shows first and second finger conducting plates 306 that may be used in the slip ring assembly 100 shown in FIG. 1 through FIG. 3 and using two columns of finger conducting plates 306 for providing two columns of electrical connections 110. Indeed, in an arrangement using a single column of finger conducting plates 306, such finger conducting plates 306 can be mounted in longitudinal alignment with the center of the conducting disk 200. In such a case, the finger conducting plates 306 may be rectangularly shaped with a straight edge at the second end extending proximate the corresponding conducting disk 200 and an opposite straight edge at the first end providing the electrical connection 110. In a two-column arrangement, the finger conducting plates 306 may be each provided with a first longitudinal rectangularly shaped portion 360 at the first end for providing parallel electrical connections 110 aligned outside the housing 102, and a second portion 362 angularly extending with respect to the first portion 360 at the second end, the second portion 362 extending in the direction of the center of the conducting disks 200 to ease electrical contact between the conducting fingers 302, 304 and the conducting disk 200. Other arrangements could be considered, as it should be apparent to the skilled addressee.

The slip ring assembly 100 previously described may be of great advantage over the electrical arrangements of the prior art presently used since maintenance operations can be drastically reduced. For example, it is believed that such slip ring assembly 100 may be maintenance free for up to 40 years, which is of great advantage over the existing used solutions which require more frequent maintenance operations. Moreover, thanks to its specific design, the slip ring assembly 100 may be used in high ampacity and power applications requiring currents up to 2000 A to 3000 A. As it should now be apparent to the skilled addressee, the size of the conducting disks 200 and the number of conducting fingers 302 and 304 will determine the maximum ampacity and short-circuit level that can be handled by the slip ring assembly 100.

While in the above-described embodiment, the conducting disks 200 are identical, it should be understood that other configurations are possible. For example, the conducting disks 200 may be provided with an inner aperture of which the diameter varies from one conducting disk 200 to another. The lowest conducting disk 200 is provided with the inner aperture having the smallest diameter and the diameter of the inner aperture increases from the lowest conducting disk 200 to the highest conducting disk 200. As a result, the position of the inner edge is offset in a direction orthogonal to the rotation axis from one conducting plate to an adjacent one. Each elongated electrical conductor 210 is then secured to a respective conducting disk 200 either directly to the conducting disk 200 adjacent to the inner edge thereof or to a protrusion (as described above) without being in physical contact with the other conducting disks 200. The offset between the inner edges of two adjacent conducting disks 200 is chosen as a function of the dimensions of the elongated electrical conductors 210 so that each elongated electrical conductor 210 be in physical contact only with a single conducting disk 200.

While the lateral wall of the housing 102 comprises four panels, it should be understood that the number of panels may vary. For example, the side of the lateral wall on which slip rings are present may comprise no panel.

Although the above description relates to specific preferred embodiments as presently contemplated by the inventors, it will be understood that the invention in its broad aspect includes mechanical and functional equivalents of the elements described herein.

What is claimed is:

1. A slip ring assembly for electrically connecting a generator mounted in a rotatable nacelle of an orientable wind turbine and fixed electrical distribution conductors mounted to a fixed pole of the orientable wind turbine, the slip ring assembly comprising:
   a plurality of conducting disks being spaced-apart and stacked mounted along a common rotation axis, each of the conducting disks being electrically connectable to a respective electrical output of the generator and being fixedly securable to the generator so that a rotation of the rotatable nacelle triggers a rotation of the conducting disks; and
   a plurality of slip ring devices each being electrically connectable and mechanically securable to a respective one of the fixed electrical distribution conductors so as to have a fixed position relative to the fixed pole, each one of the plurality of the slip ring devices comprising at least one upper conducting finger and at least one lower conducting finger arranged so as to rotatably receive a respective one of the plurality of conducting disks therebetween and provide an electrical connection between the respective one of the plurality of conducting disks and the slip ring device, with a rotation of the nacelle triggering a rotation of the conducting disks relative to the at least one upper conducting finger and the at least one lower conducting finger so that an electrical current flows between the generator and the fixed electrical distribution conductors during the rotation of the nacelle.

2. The slip ring assembly of claim 1, further comprising a housing positioned so as to have a fixed position relative to the fixed pole, the conducting disks being positioned within the housing and being rotatable relative to the housing.

3. The slip ring assembly of claim 2, wherein the housing comprises a first wall provided with a connection aperture, a second wall opposite to the first wall and a lateral wall extending between the first and second walls, the second wall being securable to the fixed pole.

4. The slip ring assembly of claim 3, wherein each one of the plurality of slip ring devices comprises a conducting plate extending longitudinally between a first plate end and a second plate end and having the at least one upper conducting finger projecting from the first plate end and secured on a first face thereof and the at least one upper conducting finger projecting from the first plate end and secured on a second face thereof, the second face being opposite to the first face, and the second plate end being electrically connectable to a given one of the fixed electrical distribution conductors.

5. The slip ring assembly of claim 4, wherein the lateral wall is provided with a plurality of connection holes each for receiving the conducting plate of a respective one of the slip ring devices therein.

6. The slip ring assembly of claim 3, wherein the conducting disks are rotatably secured to the second wall of the housing.

7. The slip ring assembly of claim 1, further comprising a plurality of elongated conductors each extending longitudinally between a first connection end electrically connectable to the generator and a second connection end electrically connected to a respective one of the conducting disks.

8. The slip ring assembly of claim 7, wherein each one of the elongated conductors extends within a tunnel formed by an inner aperture of the conducting disks up to the respective one of the conducting disks and through a connection aperture of a housing.

9. The slip ring assembly of claim 8, wherein a diameter of the inner aperture is identical for all of the conducting disks.

10. The slip ring assembly of claim 9, wherein an inner edge of each one of the conducting disks is provided with a inwardly projecting mounting section, the second connection end elongated conductor being secured to the inwardly projecting mounting section.

11. The slip ring assembly of claim 8, wherein a diameter of the inner aperture varies from one of the conducting disks to another one of the conducting disks.

12. The slip ring assembly of claim 7, further comprising a cover rotatably mounted to a housing and comprising a plurality of conductor holes each for receiving a respective one of the elongated conductors.

13. The slip ring assembly of claim 1, further comprising a plurality of resilient devices each being mounted with a corresponding one of the slip ring devices for urging the at least one upper conducting finger and the at least one lower conducting finger against the respective one of the conducting disks to maintain the electrical connection therebetween.

14. The slip ring assembly of claim 13, wherein the at least one upper conducting finger comprises a plurality of upper fingers mounted side-by-side and the at least one lower conducting finger comprises a plurality of lower fingers mounted side-by-side and each being associated with a respective one of the upper fingers to form a plurality of pairs of fingers.

15. The slip ring assembly of claim 14, wherein each one of the resilient devices comprises a plurality of springs each being associated with a respective one of the pairs of fingers.

16. The slip ring assembly of claim 15, wherein each one of the upper fingers and each one of the lower fingers are each provided with a rounded end for abutting a conducting plate.

17. The slip ring assembly of claim 1, wherein each one of the upper and lower conducting fingers is silver plated.

18. The slip ring assembly of claim 1, wherein each one of the conducting disks is provided with an outer upper silver plated surface and an outer lower silver plated surface.

* * * * *